May 4, 1965          E. F. MORAN          3,181,453

PORTABLE POWER OPERATED BARBECUE APPARATUS

Filed Feb. 18, 1964

INVENTOR.
EDWARD F. MORAN

BY Hay Cole

ATTORNEY

United States Patent Office 3,181,453
Patented May 4, 1965

3,181,453
PORTABLE POWER OPERATED BARBECUE APPARATUS
Edward F. Moran, 510 Park Ave., Perkasie, Pa.
Filed Feb. 18, 1964, Ser. No. 345,673
1 Claim. (Cl. 99—349)

This invention relates to barbecue or grilling apparatus and more particularly to improved, food holding means for use in such apparatus.

An object of my invention is the provision of improved, food holding means as above which are conveniently adjustable to enable the holding thereby of meats and other foods of varying thicknesses.

Another object of my invention is the provision of improved food holding means as above which are particularly, though not exclusively, adapted for use in conjunction with portable, power operated barbecue apparatus of the nature disclosed in my copending U.S. application, Serial No. 234,740, filed November 1, 1962.

Another object of my invention is the provision of improved food holding means as above of uncomplicated design and construction which makes possible the relatively inexpensive manufacture thereof.

A further object of my invention is the provision of improved, food holding means as above of sturdy and dependable construction which will require little or no maintenance, except cleaning, during the long useful life thereof.

In a preferred embodiment herein disclosed, first and second holding members are provided and are operable to clamp the food to be cooked therebetween. Conveniently adjustable, and readily releasable, locking means are provided on the holding members whereby the relative positions of the latter may be adjusted to be commensurate with the thickness of the food to be maintained therebetween. Mounting means extend from one of the holding members for the operative attachment of the food holding means of my invention to portable, power operated barbecue apparatus of the nature referred to hereinabove. Handle means are also provided for the convenient handling of the food holding means.

Figure 1:
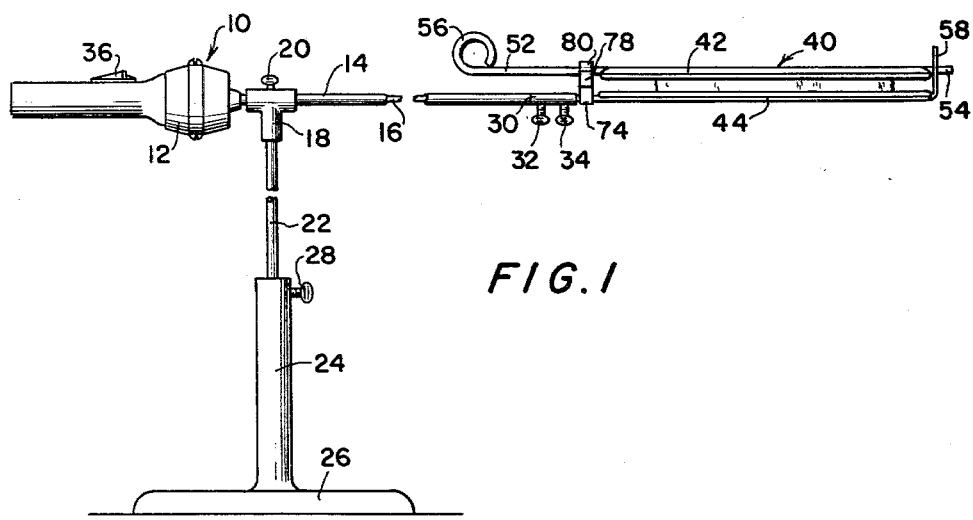
Figure 2:
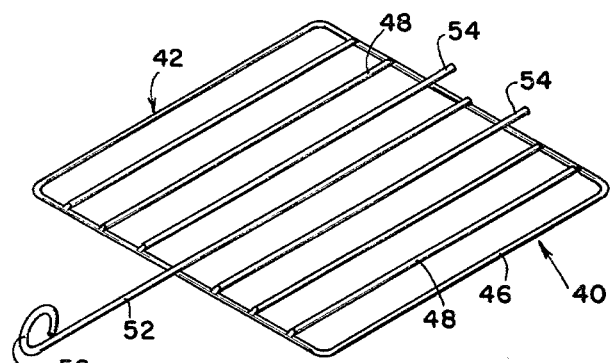
Figure 2:
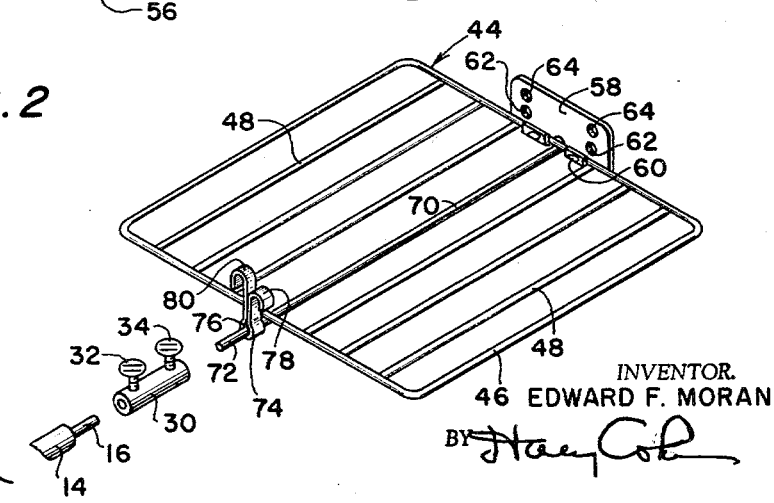

The above and other objects and advantages of my invention are believed made clear by the following detailed description thereof taken in conjunction with the accompanying drawings wherein, FIG. 1 is an elevational view of the food holding means of my invention depicted in conjunction with portable, power operated barbecue apparatus of the nature referred to hereinabove; and FIG. 2 is an exploded perspective view of the food holding means of my invention.

Referring now to FIG. 1, portable, power operated barbecue apparatus of the nature referred to hereinabove are generally indicated at 10 and, briefly described, comprise a drive motor and battery casing 12 from which project as shown concentrically positioned, stationary shaft support member 14 and rotatable driven shaft 16. A generally T-shaped support member 18 is positioned around the said shaft support member 14 and adjustable through a variety of positions relative thereto by a manually operable set-screw 20 extending therebetween. A support shaft 22 extends as shown from the said T-shaped support member 18 into telescoping relationship with the hollow upright portion 24 of a base member 26 provided therefor. A manually operable set screw 28 is provided in the said upright base member portion 24 and extends therethrough into contact with the said support shaft 22 whereby the height of the driven shaft 16 relative to the said base member 26 may be conveniently adjusted.

A tubular, attachment collar 30, comprising manually operable set screws 32 and 34, respectively, extending therethrough into the hollow interior portion thereof, is provided, and attached at one extremity thereof to the adjacent extremity of driven shaft 16 by the insertion of the latter into the former and the subsequent tightening of set screw 32 thereagainst. A manually operable, "on-off" switch 36 is provided on the battery and motor casing 12 whereby driven rotation of the driven shaft 16 may be effected by moving the said switch to the "on" position thereof.

The food holding means of my invention is generally indicated at 40 in the drawings, and comprises upper and lower food holding members 42 and 44, respectively, of any suitably heat resistant metal, as for example stainless steel. Alternatively, the said members may be constructed of a less expensive metal and then chormium plated to insure that foods clamped therebetween are not adversely affected thereby during the application of cooking heat thereto. In the herein disclosed preferred embodiment, each of the food holding members comprises a generally rectangular support frame 46 with generally straight elements 48 extending thereacross and attached thereto at opposite extremities thereof in any convenient manner, as for example by spot welding. The primary consideration here is, of course, to provide food holding members which are operable to suitably clamp foods of widely varying widths, as for example a large steak or much smaller chicken parts, therebetween without the said foods falling therefrom, while at the same time exposing the maximum possible areas of the said foods to the cooking heat. It should thus become clear that a wide variety of different food holding member constructions would immediately become obvious, in view of the present disclosure, to those skilled in this art, whereby is emphasized that the depicted construction is intended primarily as illustrative only of one such construction which has proven satisfactory.

The centrally located straight element 48 of the upper food holding member 42 includes a straight portion 52 which extends as shown beyond one edge of the frame member 46, while the two straight elements 48 positioned to either side thereof include straight portions 54 which extend as shown beyond the opposite edge of the said frame member. A curved portion 56 is formed at the extremity of extending straight portion 52 to provide a handle for the food holding means.

A locking plate 58 is fixedly attached to the frame member 46 of the lower food holding member 44 in any convenient manner, as for example by bending tab-like portions 60 of the former over the latter and spot welding the same thereto. A plurality of groups of locking apertures, 62 and 64, respectively, are formed as shown in the said plate and it should be noted that the two apertures of each of the said groups are formed at substantially the same level above the frame member 46, while each of the said groups of apertures is formed at a different level above the said frame member.

A support shaft 70 extends across the frame member 46 of the lower holding member 44 and is attached thereto in the manner of the straight elements 48. The said support shaft 70 includes a portion 72 thereof which extends as shown beyond one edge of the said frame member. A locking bracket 74, which may be conveniently formed by appropriately bending a straight strip of metal to the desired shape, may be conveniently attached to the said support shaft portion 72 as by spot welding as indicated at 76, and includes locking notches 78 and 80, respectively, formed therein. As should be noted, the said locking notches are formed at different levels above the frame member 46, with the locking notch 78 being formed at approximately the same level above the frame member as the group of locking apertures 62, and the locking notch 80 being formed at approximately the same level above the said frame member as the group of locking apertures 64.

In use, food to be cooked is placed atop the lower holding member 44, and the upper holding member 42 placed thereover and attached thereto to clamp the food securely therebetween. The said upper and lower members are attached to each other by inserting the projecting, straight element portions 54 of the upper holding member into one of the groups of locking apertures 62 or 64, respectively. The thickness of the food to be cooked determines which of the said groups of locking apertures is chosen in that the apertures 62 would be chosen for relatively thin foods, while the apertures 64 would be chosen for relatively thick foods. The said upper holding member is then pressed tightly against the food by use of handle 56 and the straight element projecting portion 52 placed in the locking notch which is located at approximately the same level above the frame member 46 of the lower holding member as are the locking apertures of the chosen group. Thus, for relatively thin foods, as for example a hamburger or a thin steak, locking apertures 62 and locking notch 78 would be utilized, whereas locking apertures 64 and locking notch 80 would be utilized for thicker foods, as for example chicken legs or a thick steak.

Although only two groups of locking apertures, and two correspondingly positioned locking notches have been depicted and described, it is to be understood that this is intended as illustrative only, and that a wider variety may of course be provided. Attachment of the food holding means of my invention to the portable, power operated barbecue apparatus indicated generally at 10 is conveniently effected by inserting the projecting extremity of support shaft 72 into the open extremity of tubular, attachment collar 30 remote from driven shaft 16, and the tightening of set screw 34 against the said support shaft extremity.

Thus, may be understood whereby food may be securely held within the holding means of my invention, regardless of thickness thereof within practicable limits, and the said holding means then conveniently attached to suitable, power operated barbecue apparatus for the slow rotation thereof, and the food held thereby, over a cooking fire. Alternatively, of course, the holding means of my invention are equally well utilizable in conjunction with hand operated barbecue apparatus, or alone, in the latter case, through the manual use of handle 56.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claim.

What is claimed is:

A food holding device, comprising: first and second substantially flat food holding members; said members being attachable to each other in a substantially parallel planar relation with alternatively a relatively close interspacing to securely clamp therebetween foods of a relatively small thickness, and a relatively distant interspacing to securely clamp therebetween foods of a relatively large thickness; each of said members including a congruent support frame with an open central portion, a central elongated element attached to two opposite sides of this frame dividing this frame into two symmetrical halves and having a portion extending beyond one of said attachment sides to provide a handle, the two respective handles being parallel and manually graspable by a single hand, and a plurality of additional elongated elements attached to said two opposite sides symmetrically with respect to said respective central elongated element, the frame, the central elongated element and the additional elongated elements of each said member being respectively substantially coplanar; a symmetrical pair of additional elongated elements of said first member having ends extending beyond said other attachment side; a locking plate attached to and projecting from and external to said other attachment side of said frame of said second member towards said first member, having two pairs of closed periphery apertures therein, each pair of apertures alternatively adapted to receive therethrough said extending ends of said symmetrical pair of additional elongated elements of said first member, the first pair of apertures being parallel to and relatively closely spaced from said frame of said second member, the second pair of apertures being parallel to and relatively distantly spaced from said frame of said second member; a locking bracket attached to and projecting from said central elongated element of said second frame and external to said second frame towards said first member, having two locking notches therein, each notch alternatively adapted to sidewise receive therein said extending portion of said central elongated element of said first member, the first notch being relatively closely spaced from said frame of said second member, the second notch being relatively distantly spaced from said frame of said second member, said alternatively usable notches and extending portion of said central elongated element, and said alternatively usable pairs of apertures and extending portions of said additional elongated elements providing a symmetrical three point locking suspension, said locking plate and said locking bracket having a spacing therebetween substantially equal to, and receiving closely therebetween said attachment sides of said frame of said first member.

References Cited by the Examiner
UNITED STATES PATENTS

| | | | |
|---|---|---|---|
| 21,157 | 8/58 | Thomas | 99—402 |
| 523,127 | 7/94 | Miller | 99—402 |
| 2,297,825 | 10/42 | Bobo | 99—427 |
| 2,681,001 | 6/54 | Smith | 99—402 |
| 2,925,771 | 2/60 | Avetta | 99—427 |
| 2,983,218 | 5/61 | Persinger et al. | 99—427 |

FOREIGN PATENTS 344,538   3/60   Switzerland.

ROBERT E. PULFREY, *Primary Examiner.*
LAWRENCE CHARLES, *Examiner.*